United States Patent [19]
Podhajecki

[11] Patent Number: 4,874,260
[45] Date of Patent: Oct. 17, 1989

[54] CAGE OUTER DIAMETER PROFILE

[75] Inventor: Stephen T. Podhajecki, Norfolk, Conn.

[73] Assignee: The Torrington Company, Torrington, Conn.

[21] Appl. No.: 171,046

[22] Filed: Mar. 21, 1988

[51] Int. Cl.$^4$ .............................................. F16C 33/48
[52] U.S. Cl. ..................................... 384/470; 384/580
[58] Field of Search ...................... 29/148.46; 384/470, 384/572, 575, 576, 580

[56] References Cited

U.S. PATENT DOCUMENTS

| | | | |
|---|---|---|---|
| 3,114,960 | 12/1963 | Einaudi | 29/148.4 C |
| 3,228,090 | 1/1966 | Schaeffler | 29/148.4 C |
| 3,582,165 | 6/1971 | Koch | 384/580 |
| 3,797,083 | 3/1974 | Schaeffler et al. | 29/148.4 C |
| 4,208,078 | 6/1980 | Miki | 384/572 |

FOREIGN PATENT DOCUMENTS 2441810  11/1976  Fed. Rep. of Germany ..... 29/148.4 C

*Primary Examiner*—Howard N. Goldberg
*Assistant Examiner*—Andrew E. Rawlins
*Attorney, Agent, or Firm*—Wayne O. Traynham

[57] ABSTRACT

The cage portion of a cage and roller assembly has two annular end rims joined by cross-bars around the periphery of each rim. The rims and cross-bars define multiple pockets which hold the rollers. The cross-bars are configured to contain the rollers within these pockets; in addition, coined ramp surfaces and land surfaces on the cross-bar outer surfaces extend radially outward farther than the outer surfaces of the end rims and are configured to provide improved lubrication between the outer surface of the cage and an outer raceway.

3 Claims, 2 Drawing Sheets

CAGE OUTER DIAMETER PROFILE

This invention relates to anti-friction bearings that include the use of a cage with roller bearings. More specifically, this invention is a cage and roller assembly wherein the cage has an over diameter (O.D.) which enhances lubrication of the cage.

Conventional anti-friction bearings of this type include an inner race, an outer race, a cage, and multiple rollers situated in the pockets of the cage between the inner and outer races. A typical cage outer diameter (O.D..) profile is generally square or rectangular, with the sides of the cage cross-bars being generally perpendicular to the outer surface of the cage. This outer surface is generally flat, so as to form a flush running fit between the outer cage surface and the outer raceway. Examples of this type of cage O.D. profile are included in U.S. Pat. No. 2,933,803 for a "Method of Producing Cages For Roller Bearings And More Particularly For Needle Roller Bearings" issued on April 26, 1960, in the name of George Shaeffler, and U.S. Pat. No. 3,114,960 for a "Method of Manufacturing Metal Cages for Needle Bearings" issued on December 24, 1963, in the name of Giacomo Einaudi.

Other prior art cages have O.D.. profiles with contoured outer surfaces on the cage cross-bars. Examples of this type of cage include U.S. Pat. No. 3,582,165 for a "Cage-And-Roller Combination" and 3,626,565 for a "Cage And Roller Method", both issued in the name of Hans W. Koch on June 1, 1971, and December 14, 1971, respectively, and U.S. Pat. No. 3,675,292 for a "Method For Making A Roller Bearing Retainer", issued in the name of James L. Vannest on July 11, 1972.

One problem with cages of this type is the lack of adequate lubrication between the outer raceway and the outer surface of the cage. Some of the cage O.D. profiles actually scrape off lubricants from a particular spot on the outer raceway with the leading edge of the cross-bar members before the rest of the outer cage surface passes that spot on the outer raceway. This leads to increased friction, increased heat generation, and reduced bearing life.

The cage O.D. profile of the present invention provides for superior lubrication relative to any of the prior art described above. Briefly described, the cage and roller assembly comprises a cage with multiple cross-bars which are concentric with the longitudinal axis of the bearing and joined at their ends by a pair of end rims. Multiple pockets are defined by the cross-bars and end rims, and each pocket can accommodate a bearing roller so as to restrain the roller in both radial directions. A portion of each end of each cross-bar, adjacent to each end rim, is raised on the outer surface so as to form two land surfaces upon which the cage rides on the outer raceway. The outer edges of these land surfaces are coined in the circumferential direction, resulting in an O.D. profile which tends to "scoop" or force lubricant into the space between the outer surface of the lands and an outer raceway. This hydrodynamic wedge effect pressurizes the lubricant above normal values so as to increase the lubricating action on the affected surfaces. This invention is particularly well-suited for use with connecting rod bearings used in internal combustion engines. Of even more specific interest is its use in conjunction with a two-cycle engine, in which a finely atomized fuel/oil mixture performs the lubrication function.

This invention, as well as its many advantages, may be further understood by reference to the following detailed description and drawings in which.

Figure 1:
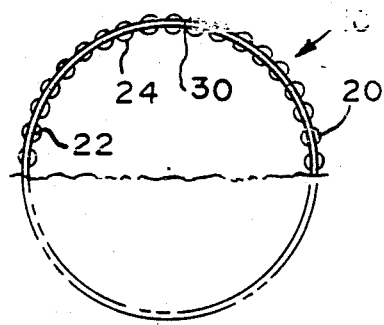
FIG. 1 is a fragmentary axial view in elevation of a cage-and-roller assembly of the present invention.
Figure 2:
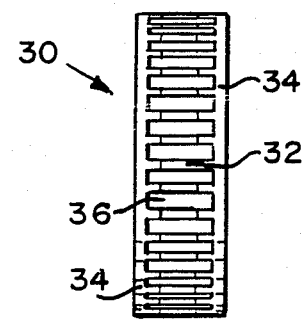
FIG. 2 is a radial view in elevation of the cage portion of the assembly shown in FIG. 1, looking at the outer surfaces of the cage.
Figure 3:
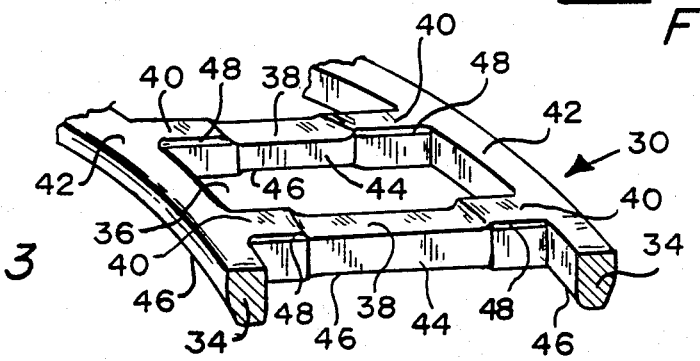
FIG. 3 is a fragmentary perspective view of the cage shown in FIG. 2.
Figure 5:
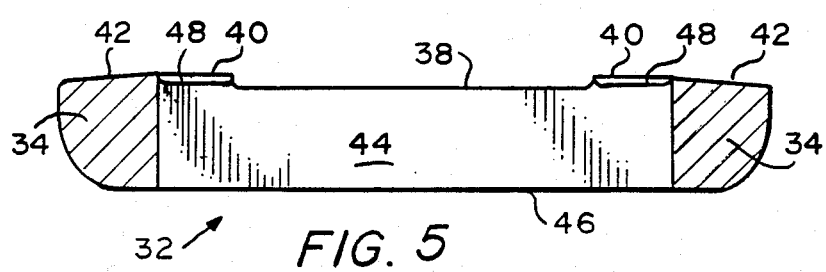
FIG. 5 is a sectional view of the same cage taken along line 5—5 of FIG. 4.
Figure 4:
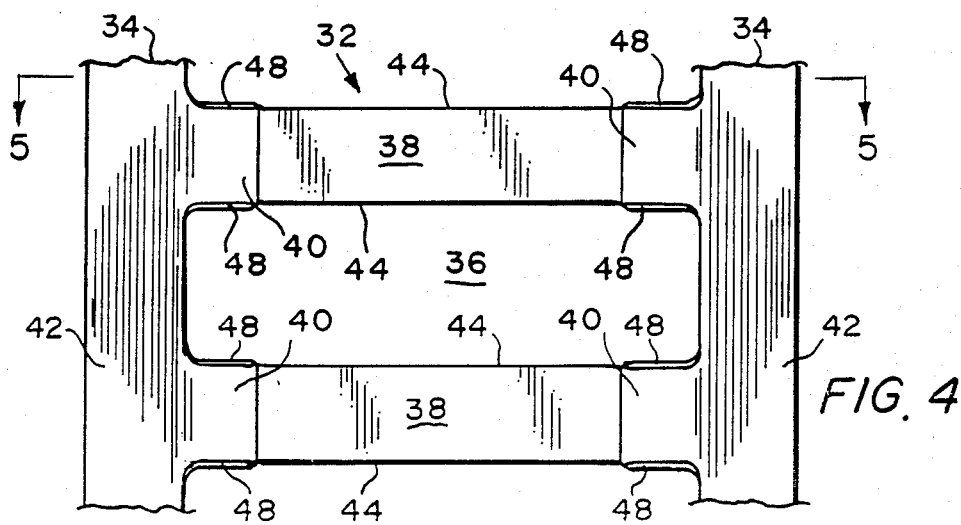
FIG. 4 is an enlarged fragmentary view of the cage only, looking at a radially inward angle at the outer surface of the cage, as in FIG. 2.

Referring to the drawings, and more particularly to FIG. 1, a cage-and-roller assembly 10 comprises multiple rollers 20, having end surfaces 22 and circumferential or outer side surfaces 24, and a cage 30.

As illustrated in FIGS. 2-5, several components make up the cage 30, including multiple cross-bars 32, two end rims 34, and pockets 36 defined by cross-bars 32 and rims 34. Various surfaces on cage 30 are important and include cross-bar midsection outer surfaces 38, cross-bar land surfaces 40, end rim outer surfaces 42, cross-bar side surfaces 44, and cage inner surface 46. The cage 30 is preferably constructed in two parts, each a half cage which is identical to the other.

Each pocket 36 is sized to loosely contain one roller 20. Cross-bar side surfaces 44 on each side of pocket 36 are configured, in conjunction with land surfaces 40 and cage inner surface 46, so as to restrain roller 20 from radial motion out of pocket 36, in either the outward or inward radial directions. End rims 34 constrain motion of the roller in the axial direction. This allows the cage-and roller assembly 10 to be completely removed from its normal operational location, e.g., in a connecting rod, without the rollers falling out of the cage. The assembly 10 is an entirely self-contained unit.

Figure 6:
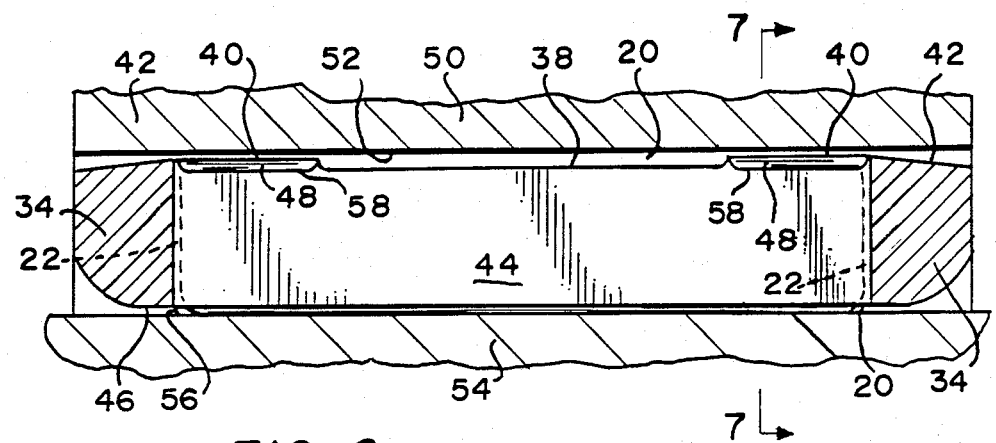
FIG. 6 is a sectional view of the cage-and-roller assembly, similar to FIG. 5, with inner and outer races included with the rollers to illustrate the relative positions of the various components.
Figure 7:
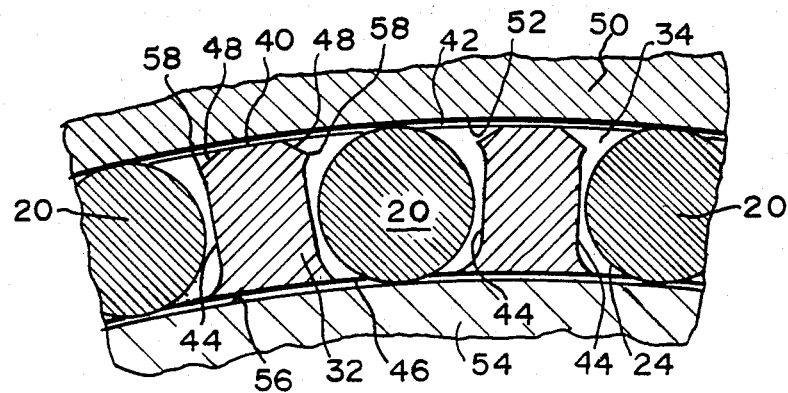
FIG. 7 is a sectional view of the assembly, looking in the axial direction, along line 7—7 of FIG. 6.

Turning now to FIGS. 6 and 7, the configuration of surfaces 40, 42, 44, and 46 are clearly shown to illustrate how cage 30 holds rollers 20 within pockets 36, and further to illustrate the superior lubrication means described in more detail below. The land surfaces 40 of each cross-bar are coined, thereby forming two coined ramp surfaces 48 adjacent to each surface 40. Land surfaces 40 ride on an outer race 50 which has an outer raceway 52. Inner surface 46 is nearer an inner race 54 which has an inner raceway 56. The land surfaces 40 have a greater diameter than that of midsection outer surfaces 38 and end rim outer surfaces 42 (see FIGS. 5 and 6) so as to allow sufficient clearance for surfaces 42 in special applications where the outer raceway 52 has irregularities which could tend to snag surfaces 42, thereby increasing friction between raceway 52 and assembly 10.

The coining process also spreads surface 40 in the circumferential directions, causing ramp surfaces 48 to extend farther into the two adjacent pockets 36. This extension of surfaces 48 forms edges 58 and helps give cross-bar side surfaces 44 a somewhat concave sectional profile (see FIG. 7) which mates better with the spherical convex sectional profile of rollers 20, thereby limiting outward and inward radial motion of rollers 20.

The most important structural feature of this invention is the proximity of the cross-bar land surfaces 40 to the outer raceway 52. Land surfaces 40 virtually ride on outer raceway 52, along with rollers 20. The only thing separating surfaces 40 from raceway 52 is a very thin film of pressurized lubricant (not shown). When surfaces 40 extend radially outward a distance approaching 100% of the diameter of rollers 20, the edges 58 help to develop a superior lubrication film between outer raceway 52 and land surfaces 40 by funneling lubricant between outer raceway 52 and ramp surfaces 48. The lubricant may be any suitable fluid, such as a liquid lubricant or a gaseous/vaporous lubricant. For example, in a two-cycle engine, a mixture of fuel and oil performs the lubrication function. The fuel/oil mixture is finely atomized in the vicinity of the connecting rod bearing so that the lubricant is a very fine mist. This mist is effectively a fluid composed of a mixture of liquid particles and vapor. This funneling or scooping action results in a pressurization of the lubricant as it passes over edge 58 toward land surface 40 via ramp surface 48. This hydrodynamic wedge effect provides a relatively high-pressure lubricant film layer between raceway 52 and land surfaces 40, which minimizes bearing wear and thereby enhances performance of the associated component, e.g., a connecting rod.

Possible modifications of the preferred embodiment of the present invention include the use of cross-bars whose outer surface has been formed by means other than coining. For example, machined surfaces corresponding to ramp surfaces 48 would be equally effective in enhancing lubrication. Another possible modification is a variation of the number of pieces comprising the cage 30. Although the preferred embodiment utilizes a two-piece construction, the cage could be made of one solid piece, one split piece, three pieces, or any number of multiple pieces properly assembled to form a 360° cage. Other modifications and advantages of this invention will be obvious to persons skilled in the art.

I claim:

1. A cage-and-roller assembly comprising an annular cage and multiple rollers concentric with and radially inward of an outer raceway and lubricated with a fluid lubricant, wherein said cage comprises:

two annular end rims having outer surfaces;

multiple cross-bars, each of said cross-bars having a midsection outer surface, two land surfaces, two side surfaces and two ends, each of said ends being joined to one of said end rims, and said cross-bar land surfaces extending radially outwardly a greater distance than said midsection outer surface and said end rim outer surfaces so as to allow said cross-bar land surfaces to ride on said outer raceway;

multiple pockets defined by said end rims and said cross-bars, and sized to accommodate one of said rollers in each of said pockets; and multiple ramp surfaces formed axially on each side of each of said cross-bar land surfaces, each of said ramp surfaces being formed at the juncture of said cross-bar land surface and one of said two cross-bar side surfaces, said ramp surface forming a tangential angle with said cross-bar land surface, and said ramp surface extending circumferentially from said cross-bar land surface into the adjacent pocket so as to limit outward radial motion of said rollers, said tangential angle of said ramp surfaces resulting in a hydrodynamic wedge effect to increase the pressure of said fluid lubricant between said cross-bar land surfaces and said outer raceway.

2. An assembly according to claim 1, wherein said multiple ramp surfaces are formed by a coining process.

3. An assembly according to claim 1, wherein said multiple ramp surfaces are formed by a machining process.

* * * * *